United States Patent
Widl

[15] 3,665,328

[45] May 23, 1972

[54] SYNCHRONIZING SIGNAL GENERATOR FOR USE WITH A DIFFERENTIALLY MULTIPHASE MODULATED SIGNAL RECEIVER

[72] Inventor: Walter Herbert Erwin Widl, Bandhagen, Sweden

[73] Assignee: Telefonaktiebolaget LM Ericson, Stockholm, Sweden

[22] Filed: June 24, 1970

[21] Appl. No.: 49,255

[30] Foreign Application Priority Data

July 2, 1969 Sweden..................................9381/69

[52] U.S. Cl...............................329/110, 325/476, 325/320, 328/155, 329/145

[51] Int. Cl...........................................................H03d 3/02

[58] Field of Search..................329/145, 178, 110; 325/476, 325/65, 42, 320; 328/71, 155

[56] References Cited

UNITED STATES PATENTS 3,392,337 7/1968 Neuburger.............................329/145
3,083,340 3/1963 Nelson..............................329/178 X
3,387,220 6/1968 Lender..............................329/145 X
2,580,148 12/1951 Wirkler..............................329/145 X

*Primary Examiner*—Alfred L. Brody
*Attorney*—Hane, Baxley & Spiecens

[57] ABSTRACT

In data receivers used for receiving and demodulating a differentially multiphase modulated signal, i.e. a signal in which the phase position is changed with definite intervals wherein the magnitude of the phase change determines the information contents of the signal received, there is included an arrangement for producing a control signal upon the occurrence of such phase changes. The arrangement includes a phase comparison circuit having one input supplied by the input of the receiver and another input connected to the output of a delay circuit connected to the receiver input. The delay of said delay circuit is approximately equal to half of the interval in which the phase position is changed. The output signal value of the phase comparison circuit is changed at the beginning of each interval and the control signal is obtained from a differentiating circuit connected to the output of the phase comparison circuit.

3 Claims, 1 Drawing Figure

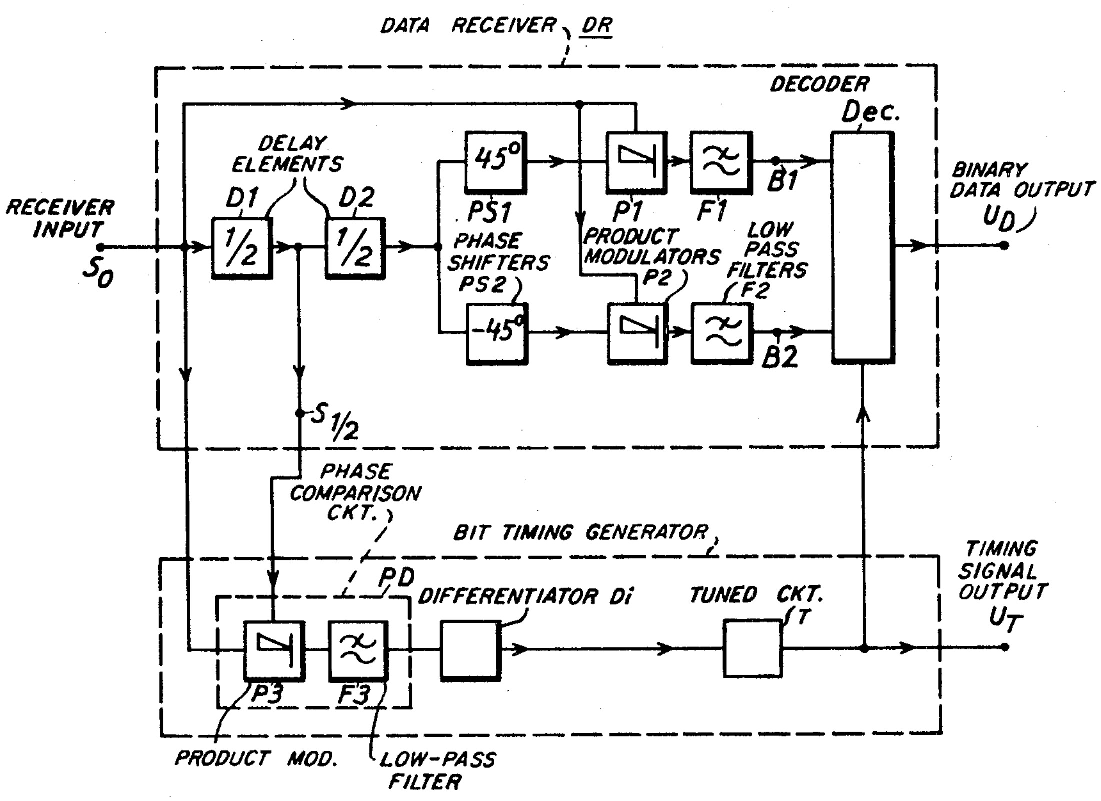
INVENTOR
Walter Herbert Erwin Widl
BY Hane, Baxley and Spiecens
ATTORNEYS

SYNCHRONIZING SIGNAL GENERATOR FOR USE WITH A DIFFERENTIALLY MULTIPHASE MODULATED SIGNAL RECEIVER

The present invention refers to an arrangement for producing a control signal upon the occurrence of phase changes in a data receiver for receiving and demodulating a differentially multiphase modulated signal, i.e., a signal in which the phase position is changed at definite intervals with the magnitude of the phase change determining the information content of the signal received.

For the transmission of binary information via telephone lines a generally phase-modulated carrier wave is used at transmission rates which are greater than 1,200 bits a second. The simplest phase modulated system is that wherein the transmitted carrier wave can get two different phase positions which are 180° apart, whereby either the two phase positions in themselves represent the two binary conditions or the phase change determines the binary values, for example, in such a way that a maintained phase position corresponds to a binary zero and a phase shift represents a binary, i.e., one, a so-called differential phase modulation. In such a transmission system, the transmitter and receiver operate in bit-synchronism. Therefore, in order to have a correct decoding, it is necessary to obtain information of the moment when a new signal element begins being sent, so that, upon receiving the signal element, the decoder of the receiver can be scanned in the middle of a time period. In the above-described two-phase method this is obtained in the simplest way by utilizing the polarity changes of the demodulated signal to control the phase position of an oscillator from which the scanning signal can be obtained. This however requires changes in the binary values fairly often, i.e., the transmitted information should not consist of, for example, a great number of zeros in sequence. However such a limitation does not imply a very important disadvantage.

In order to increase the transmission rate beyond what is possible with the above described two-phase modulation a so-called multiphase modulation can be used with such modulation the carrier wave can have a larger number of different phase positions or phase shifts and each fixed phase position and phase shift respectively represents a combination of binary signs. In that case preferably differential phase modulation is used. For example four different phase shift values may be used, each of them representing a combination of two bits. This however has the consequence that, on the receiver side, upon demodulation, a signal without changes of signs is obtained if a certain two-bit combination is repeated in the transmitted signal, for example 010101 . . . . In order to be able to control, as with two-phase modulation, the scanning or strobe signal by means of the polarity or sign shifts of the demodulated signal, further restrictions must be introduced concerning the composition of the transmitted signal. In order to avoid these limitations a separate synchronizing signal may be transmitted. But, this involves an expensive extra equipment in the transmitter and the receiver.

An object of the present invention is therefore to provide an arrangement by means of which a so-called bit timing signal which indicates the instant when a new signal element is started, can be generated in a simple way in the receiver for data transmission carried out according to the differential multiphase-modulation principle described above. The characteristic features of the invention appear from the appended claims.

The invention will be described more fully with reference to the accompanying drawing showing a block diagram of a receiver, known per se, for demodulating a differentially four-phase modulated signal, and a bit time generator connected to the receiver according to the invention.

In the drawing, $S_0$ indicates the input of a data receiver DR for the demodulation and decoding of differentially four-phase modulated signals. This input is connected to the one input of two product modulators P1 and P2, respectively, and to the first of two series connected delay elements D1 and D2, each having a delay corresponding to half a signal element length, i.e., the length corresponding to the duration of the two-bit combination signal. The output of the element D2 is connected to the other input of the product modulator P1 via a phase shifter PS1, the phase shift of which is 45°, and to the other input of the product modulator P2 via a phase shifter PS2, the phase shift of which is −45° . The two outputs of the product modulators are connected to inputs B1 and B2 respectively of a decoder Dec via individual low pass filters F1 and F2 respectively. The output of decoder Dec constituting the data output $U_D$ of the receiver at which signals corresponding to the received binary signs or values are obtained. The function of the receiver described up to now is explained in a simple way by means of an example. Assume that the binary signs are transmitted according to the following code:

The bit combination 00 corresponds to a phase shift of the size 0°

The bit combination 01 corresponds to a phase shift of the size 90°

The bit combination 11 corresponds to a phase shift of the size 180°

The bit combination 10 corresponds to a phase shift of the size −90°

In the two product modulators P1 and P2 the actual input signal is multiplied by the preceding input signal which has been phase shifted 45° and − 45° respectively. Thus the following expressions for the output signals of the modulators are obtained:

$$P1:\ \sin\left(\omega t + n\cdot\frac{\pi}{2} + m\frac{\pi}{2}\right)\sin\left(\omega t + n\cdot\frac{\pi}{2} + \frac{\pi}{4}\right)$$

$$P2:\ \sin\left(\omega t + n\cdot\frac{\pi}{2} + m\frac{\pi}{2}\right)\sin\left(\omega t + n\cdot\frac{\pi}{2} - \frac{\pi}{4}\right)$$

where $t$ indicates time, $\omega$ the angular frequency of the carrier, $n$ determines the phase position of the preceding input signal and $m$ indicates the phase shift of the actual signal relative to that of the preceding signal, i.e., $m$ indicates which bit combination if received. If multiplication is carried out in both the above expressions the following result will be obtained:

$$P1:\ \frac{1}{2}\left[\cos\left(m\frac{\pi}{2} - \frac{\pi}{4}\right) - \cos\left(2\omega t + n\cdot\pi + m\frac{\pi}{2} + \frac{\pi}{4}\right)\right]$$

$$P2:\ \frac{1}{2}\left[\cos\left(m\frac{\pi}{2} + \frac{\pi}{4}\right) - \cos\left(2\omega t + n\cdot\pi + m\frac{\pi}{2} - \frac{\pi}{4}\right)\right]$$

In these expressions the high frequency second term is removed in the filters F1 and F2, respectively, and signals of the following polarity are obtained at the inputs B1 and B2:

| m | B1 | B2 |
|---|---|---|
| 0 (corresponds to the bit combination 00) | + | + |
| 1 (corresponds to the bit combination 01) | + | − |
| 2 (corresponds to the bit combination 11) | − | − |
| −1 (corresponds to the bit combination 10) | − | + |

Thus each bit combination gives rise to a special input signal polarity combination in the decoder Dec which need carry out in principal only an alternate connection of the inputs to the output $U_D$. In order to read out the signals obtained at the output of the decoder at the correct moment, i.e., preferably in the center of the period of time during which a sign is obtained, there is however required a signal that indicates these moments. As already mentioned it is not very suitable to make use of the polarity changes of the inputs B1 and B2 for the generation of this signal, as a signal consisting of a number of repeated, equal two-bit combinations, for example the signal 01010101 , gives rise to constant input signals to the decoder.

According to the invention there is used instead a bit timing generator G for this purpose. The generator comprises a phase comparison circuit PD which, for example, can consist of a product modulator P3 and a low pass filter F3. The inputs of the product modulator are connected to the data signal input $S_0$, and the other one to the connecting point $S_{1/2}$ between the delay elements D1 and D2. It is to be emphasized that in a conventional demodulator only one delay element is provided, the delay of which is equal to the signal element length. The point $S_{1/2}$ constitutes a terminal on this delay element. Since the total delay of the delay elements D1 and D2 is equal to the signal element length two signals with the same position will always be obtained on the two inputs of the product modulator during the last half of each signal element fed to the input $S_0$. However, during the first half of the signal element two signals with different phase positions are supplied to the product modulator, provided of course that there is a phase difference between two subsequent signal elements. When the input signals of the product modulator P3 have the same phase position, there is no D.C. component in the output signal of the modulator as is apparent from the corresponding expression for the product modulators P1 and P2. However, when there are different phase positions there will be a D.C. component. Thus after the low pass filter F3 a signal is obtained which is zero during the last half of the received signal element and as a rule is not zero during its first half. Thus with the help of a differentiating circuit Di it is possible to obtain pulses at the beginning of each signal element. Accordingly, at the timing signal output $U_T$ a signal is obtained by means of which the instants when the data signal output $U_D$ is to be strobed, can be determined. In order to obtain correct information this should take place in the center of each transmitted signal element as has been mentioned. The scanning signal is then obtained in a simple way by doubling the frequency of the timing signal followed by a phase shift of the frequency doubled signal. The signal obtained from the differentiating circuit Di can also be used to control the switchings of the decoder Dec which is indicated in the figure. The generator G, can furthermore be completed by a tank circuit T, i.e., an oscillator, whose phase position is controlled by the pulses from the differentiating circuit Di. This has the advantage that a timing signal is obtained even when there are no output signals from the phase detector PD for some time because there is no phase difference between a number of subsequent input signals to the receiver, for example upon reception of the signal 000000 . . . . How many omitted signals that can be tolerated, i.e., how long the tank circuit oscillates in the correct phase position without control impulses depends in this case on the stability of the circuit, on its Q-value. The larger this value, the longer the phase position will be obtained. A great Q-value implies however a long time to build-up suitable oscillations in the tank circuit i.e., considerable time is needed from the moment information begins being received until timing information suitable for a correct decoding is obtained. Thus if only one tank circuit is used, a compromise has to be made when selecting a Q-value. In order to obtain a short build-up function and yet obtain timing information during a large number of omitted phase changes of the input signal of the receiver it is however possible to use instead of the single tank circuit T, two series-connected tank circuits, the one which is connected to the differentiating circuit Di having a high Q-value and having its output connectable to a second tank circuit which has a considerably lower Q-value. The input of the other tank circuit may then, via a switch, also be connected to the inputs B1 and B2 via differentiating circuits, the switch being controlled in such a way that when, during a certain time when no position shifts are obtained at the inputs B1 and B2, the oscillator with the lower Q-value is controlled by the oscillator with the higher Q-value. In this way the advantages of a high and a low Q-value in the tank circuit can be combined.

The arrangement described above constitutes of course only one example how the arrangement according to the invention can be used. For example, other phase comparison circuits can be used.

I claim:

1. Apparatus for generating a synchronizing signal for use with a differentially multiphase modulated signal receiver comprising an input terminal adapted to receive the differentially multiphase modulated signal, a delay means for delaying signals for a period of time in the order of half the interval between two phase changes of the differentially multiphase modulated signal, a phase comparison means having two inputs and an output for transmitting a signal when the phases of the signals at the inputs thereof have a particular relationship, means for connecting one of said inputs directly to said input terminal and the other of said inputs via said delay means to said input terminal, a signal differentiating means, and means for connecting said output to said signal differentiating means.

2. The apparatus of claim 1 further comprising an oscillator connected to the output of said signal differentiating means.

3. The apparatus of claim 1 wherein said phase comparison means comprises a product modulator and a low-pass filter connected to the output of said product modulator.

* * * * *